May 23, 1967  L. S. TAYLOR ET AL  3,320,812
GAUGE HEAD COVER
Filed July 6, 1965  2 Sheets-Sheet 1
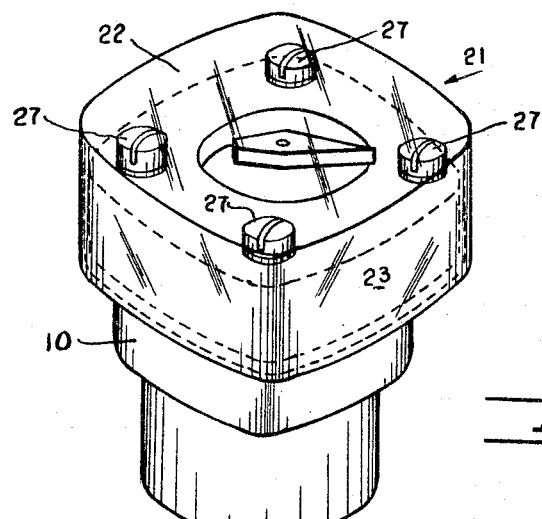
Fig.1.
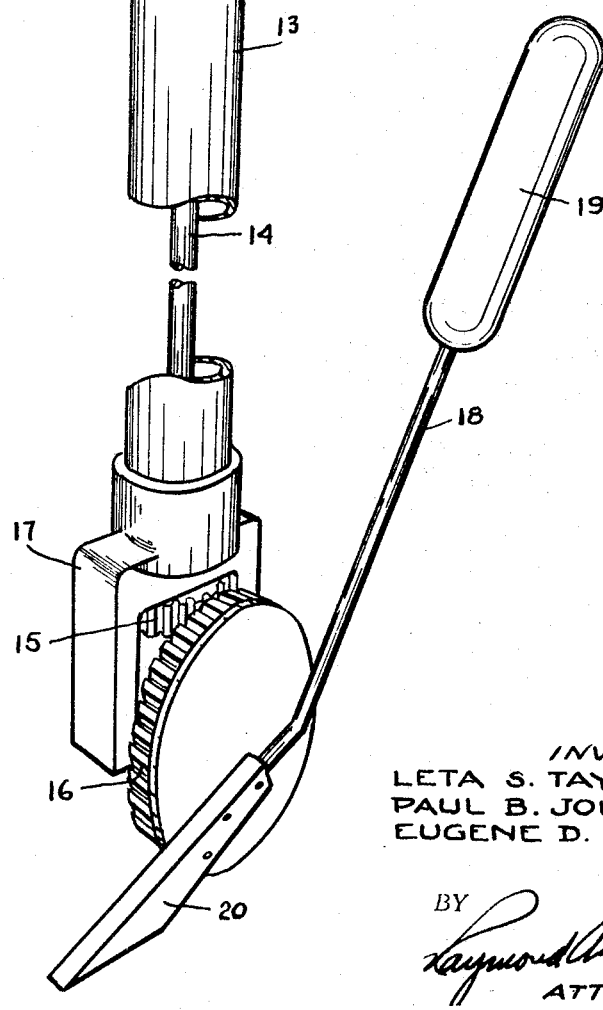
INVENTORS.
LETA S. TAYLOR
PAUL B. JOHNSON
EUGENE D. HUSKEY
BY *Raymond A. Paquin*
ATTORNEY.

May 23, 1967  L. S. TAYLOR ET AL  3,320,812
GAUGE HEAD COVER

Filed July 6, 1965  2 Sheets-Sheet 2

INVENTORS.
LETA S. TAYLOR
PAUL B. JOHNSON
EUGENE D. HUSKEY

BY Raymond A. Paquin
ATTORNEY.

United States Patent Office 3,320,812
Patented May 23, 1967

3,320,812
GAUGE HEAD COVER
Leta S. Taylor, Paul B. Johnson, and Eugene D. Huskey, Garland, Tex., assignors to J. Y. Taylor Mfg. Company, a corporation of Texas
Filed July 6, 1965, Ser. No. 469,721
3 Claims. (Cl. 73—431)

This invention relates to new and useful improvements in liquid level gauges and the like and has particular reference to the provision of a new and improved liquid level gauge head cover which is adapted to protect the head of the gauge and which is easily and quickly installed on or removed from the gauge head.

An object of the invention is to provide a new and improved cover for the head of a gauge such as a liquid level gauge which is relatively simple and economical in construction and which is quickly and easily installed on and removed from the gauge head and which provides adequate protection for the gauge head during shipment, painting of the tank and use of the gauge.

Another object is to provide a new and improved cover for a gauge head which is adapted to serve to retain the gauge head mounting bolts in their proper position on the gauge head during shipment of the gauge and until the gauge head is mounted on the tank mounting or adapter, and which will allow access to the mounting bolts and yet prevents their loss or becoming displaced.

Another object is to provide a cover for the head of a gauge and simple, economical means for retaining said cover in operative position, yet allowing ready removal thereof.

Other objects and advantages of the invention will be apparent from the following description taken in connection with the accompanying drawings wherein the preferred forms of the invention have been shown by way of illustration.

Referring to the drawings:

FIG. 1 is a perspective view of a liquid level gauge showing the cover of the invention installed on the gauge head;

Figure 2:
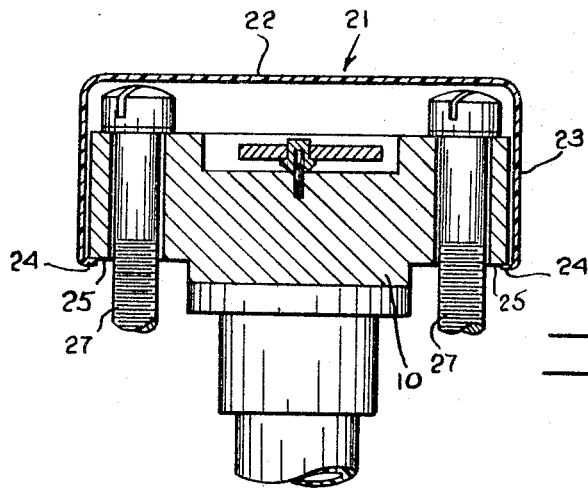
FIG. 2 is a sectional view through the gauge head and illustrating one embodiment of the invention.

Referring more particularly to the drawings wherein similar reference characters designate corresponding parts throughout the several views, the liquid level gauge shown in FIG. 1 embodying the invention comprises the gauge head 10 having a scale and an indicator for indicating the liquid content of a storage tank.

The gauge head 10 has the riser 13 depending therefrom in which is positioned the drive shaft 14 having the driven gear 15 adjacent its lower end and meshing with drive gear 16 which is pivotally mounted on fork 17 carried by riser 13.

Float rod 18 is connected to drive gear 15 and carries float 19 and counterweight 20. Float 19 pivots drive gear 16 according to the fluid quantity in the tank through actuation of driven gear 15 and thereby rotate drive shaft 14 which carries a magnet at its upper end and which is not shown. For disclosure of this arrangement see Patent Number 2,578,104 of Dec. 11, 1951. This gauge arrangement is only shown as illustrating one form of gauge on which the cover of this invention may be employed.

The gauge head cover of the present invention is designated generally at 21 and is preferably formed of transparent material although it may be of opaque material.

Where transparent material is employed, it allows the cover to be retained on the gauge head during use of the gauge as it allows viewing of the dial and indicator whereas when made of opaque material the cover must be removed to allow use of the gauge.

The gauge cover 21 has the portion 22 extending over the top of the gauge head 10 and the flanges 23 depending therefrom and due to the resiliency of the material of which the cover is made, said flanges 23 are urged toward the gauge head and the flange 24 engages the bottom wall 25 of the gauge head 10. The flanges 23, if the cover 21 is not of resilient material, are sprung inward or formed so as to tend to cling to the gauge head.

Figure 3:
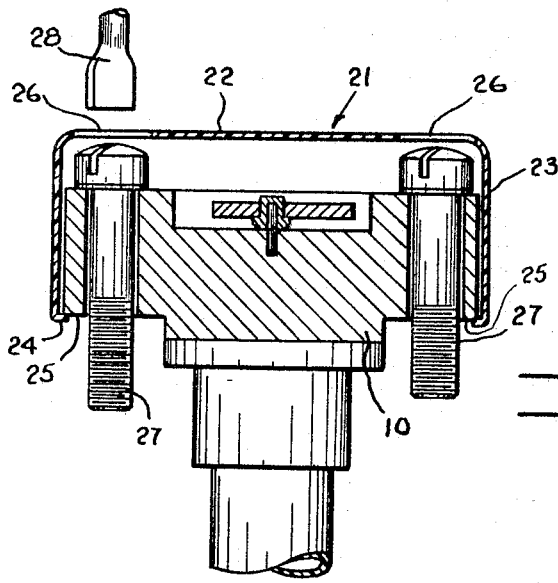
FIG. 3 is a view generally similar to FIG. 2 but illustrating a modified form of the invention.

In the form shown in FIG. 3, the cover 21 is provided with an opening 26 over the head of each gauge head mounting bolt 27. The openings 26 are of such size as to allow insertion of a screw driver 28 to connect the mounting bolts 27 to the storage tank or tank adapter but are not as large as the head of the bolt 27 whereby the bolts 27 are retained in position in their respective holes in head 10 until the head is placed on the tank or adapter and the bolts tightened to secure the head on the tank.

This arrangement insures that the bolts 27 will not become separated from the gauge head 10 during shipment or installation.

With the form of cover of FIG. 2, it is necessary to remove the cover 21 in order to install the gauge head on the tank. This is accomplished, in either form, by pulling the flange 23 of cover 21 away from the sides of the gauge head 10 until flange 24 is free of the bottom wall of the gauge head and then lifting the cover 21 off the gauge head 10.

After installation of the gauge head 10 on the tank, the cover can be replaced to protect the gauge head 10 during use of the gauge or painting of the tank or both.

From the foregoing it will be seen that we have provided new and improved means for obtaining all of the objects and advantages of the invention.

We claim:

1. A head cover for a liquid level gauge or the like comprising, a formed member of resilient material, said member having a cover portion overlying the upper surface of the gauge head and said cover portion overlying the retaining screws in said gauge head for retaining said gauge head in operative position on a storage tank and said member having side walls depending from said cover portion, said side walls being urged toward said gauge head to retain said cover portion in position on the gauge head, said cover portion having openings over the head of each of said retaining bolts for the insertion of a screwdriver to connect said bolts to the storage tanks, said openings being of smaller size than the bolt head whereby said bolts may be tightened without removal of said head cover and prevent said bolts from dropping out of said gauge head.

2. A head cover for a liquid level gauge or the like comprising, a formed member of resilient material, said member having a cover portion overlying the upper surface of the gauge head and said cover portion overlying the retaining screws in said gauge head for retaining said gauge head in operative position on a storage tank and said member having side walls depending from said cover portion, said side walls being urged toward said gauge head to retain said cover portion in position on the gauge head and a retaining flange adjacent the free edge of said side walls, said cover portion having openings over the head of each of said retaining bolts for the insertion of a screwdriver to connect said bolts to the storage tank, said openings being of smaller size than the bolt head whereby said bolts may be tightened without removal of said head cover and prevent said bolts from dropping out of said gauge head.

3. A head cover for a liquid level gauge or the like comprising, a formed member of transparent resilient material, said member having a cover portion overlying the upper surface of the gauge head and said cover portion overlying the retaining screws in said gauge head for retaining said gauge head in operative position on a storage tank and said member having side walls depending from said cover portion, said side walls being urged toward said gauge head to retain said cover portion in position on the gauge head and a retaining flange adjacent the free edge of said side walls, said cover portion having openings over the head of each of said retaining bolts for the insertion of a screwdriver to connect said bolts to the storage tank, said openings being of smaller size than the bolt head whereby said bolts may be tightened without removal of said head cover and prevent said bolts from dropping out of said gauge head.

References Cited by the Examiner
UNITED STATES PATENTS

| | | | |
|---|---|---|---|
| 1,899,043 | 2/1933 | Marden | 324—156 XR |
| 2,473,581 | 6/1949 | Ford | 73—317 XR |
| 2,612,132 | 9/1952 | Triplett | 324—156 XR |
| 2,866,940 | 12/1958 | Lamb | 220—60 XR |

LOUIS R. PRINCE, *Primary Examiner.*

D. M. YASICH, *Assistant Examiner.*